United States Patent
Lee

(10) Patent No.: US 7,365,818 B2
(45) Date of Patent: Apr. 29, 2008

(54) LIQUID CRYSTAL DISPLAY DEVICE COMPRISING A REFRACTION LAYER FORMED BETWEEN ONE OF THE DATA AND GATE BUS LINES AND THE PIXEL ELECTRODE AND METHOD OF FABRICATING THE SAME

(75) Inventor: Jae Kyun Lee, Gyeonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/737,930

(22) Filed: Dec. 18, 2003

(65) Prior Publication Data
US 2004/0125263 A1 Jul. 1, 2004

(30) Foreign Application Priority Data
Dec. 30, 2002 (KR) .............. 10-2002-0086633

(51) Int. Cl.
G02F 1/1333 (2006.01)
G02F 1/13 (2006.01)

(52) U.S. Cl. ............... 349/138; 349/187; 349/122

(58) Field of Classification Search ........... 349/43–47, 349/64, 95, 138
See application file for complete search history.

(56) References Cited

U.S. PATENT DOCUMENTS

| 6,330,043 | B1 * | 12/2001 | Kikkawa et al. ........... 349/43 |
| 6,426,787 | B1 * | 7/2002 | Satake et al. ............. 349/138 |
| 6,577,374 | B1 * | 6/2003 | Nakata et al. ............. 349/156 |
| 6,806,934 | B2 * | 10/2004 | Furuhashi et al. ........ 349/139 |
| 6,894,758 | B1 * | 5/2005 | Hagiwara et al. .......... 349/152 |
| 2001/0046005 | A1 * | 11/2001 | Lim et al. ................. 349/44 |
| 2003/0038900 | A1 * | 2/2003 | Song et al. ............... 349/43 |

* cited by examiner

Primary Examiner—Andrew Schechter
Assistant Examiner—W. Patty Chen
(74) Attorney, Agent, or Firm—McKenna Long & Aldridge, LLP

(57) ABSTRACT

A method of fabricating a liquid crystal display device includes forming a gate electrode and a gate bus line on a transparent lower substrate, forming an insulating layer on the gate electrode and gate bus line, forming an active layer on the insulating layer, forming a source electrode, a drain electrode and a data bus line, forming a passivation layer on the transparent lower substrate, forming a refraction layer on the passivation layer, and forming a pixel electrode on a surface of the refraction layer.

20 Claims, 3 Drawing Sheets

LIQUID CRYSTAL DISPLAY DEVICE COMPRISING A REFRACTION LAYER FORMED BETWEEN ONE OF THE DATA AND GATE BUS LINES AND THE PIXEL ELECTRODE AND METHOD OF FABRICATING THE SAME

The present invention claims the benefit of Korean Patent Application No. 86633/2002 filed in Korea on Dec. 30, 2002, which is hereby incorporated by reference.

BACKGROUND OF THE INVENTION

1. Field of the Invention

The present invention relates to a display device and a method of fabricating a display device, and more particularly, to a liquid crystal display device and a method of fabricating a liquid crystal display device.

2. Description of the Related Art

In general, cathode ray tube (CRT) devices have been commonly used to display images. However, due to their size and weight limitations, the CRT devices are increasingly being replaced with liquid crystal display (LCD) devices that are small sized and lightweight, and have low profiles and low power consumption.

The LCD devices include an array substrate upon which thin film transistors (TFTs) are arranged, a color filter substrate upon which red, green, and blue color filter layers are formed and which is attached to the array substrate, and liquid crystal material interposed between the array and color filter substrates. The array and color filter substrates are formed by patterning and etching metal and insulating layers using photolithographic processes including several masking steps.

Fabrication of the array substrate includes a first mask step, wherein a metal layer is deposited onto a transparent glass substrate and then etched to form a gate bus line and a gate electrode. Next, during a second mask step, a gate insulating layer, an amorphous silicon film, and a doped amorphous silicon film are coated on the transparent glass substrate to form an active layer. Then, a third mask step includes depositing a source/drain metal film onto the glass substrate and patterning the metal film to form source/drain electrodes on the active layer and a data bus line. During a fourth mask step, a passivation film is deposited onto the glass substrate and a contact hole is formed in the passivation film. Then, during a fifth mask step, an ITO transparent film is deposited onto the substrate and etched to form a pixel electrode.

Fabrication of the color filter substrate includes depositing a chrome or resin-based material onto a transparent insulating substrate, and patterning it to form a black matrix having a lattice structure. Then, red (R), green (G), and blue (B) color resins are coated on the transparent insulating substrate upon which the black matrix is formed, wherein the coated R, G, and B color resins are exposed to light and developed to form a color filter layer within pixel regions defined by the black matrix. The black matrix is formed to have the lattice structure corresponding to the gate bus lines and the data bus lines along a periphery of the active regions of the TFT array substrate, thereby preventing light leakage along a periphery of the array substrate.

FIG. 1 is a plan view of a liquid crystal display device according to the related art. In FIG. 1, gate bus lines 1a and 1b and data bus lines 3a and 3b are orthogonally arranged on a transparent lower substrate to define a plurality of unit pixel regions. In addition, thin film transistors (TFTs), which function as switching elements, are formed at crossing regions of the gate bus lines 1a and 1b and the data bus lines 3a and 3b, and pixel electrodes 9a and 9b formed of indium-thin-oxide (ITO) are disposed within the unit pixel regions. An active layer 7 is formed on gate electrodes 5 of the TFTs and includes source electrodes 6a and drain electrodes 6b, thereby forming the TFTs.

In order to protect elements on the TFT array substrate, a passivation layer 15 (in FIG. 2) is deposited on the transparent lower substrate to cover the data bus lines 3a and the source and drain electrodes 6a and 6b. Accordingly, in order to electrically interconnect the pixel electrodes 9a and 9b and the drain electrodes 6b, contact holes are formed in the passivation layer 15.

The data bus lines 3a and 3b are disposed in parallel with the pixel electrodes 9a and 9b and transmit image data to the pixel electrodes 9a and 9b. In addition, the black matrix 17 is formed on the color filter substrate and corresponds to the gate bus lines 1a and 1b, the TFTs, and the data bus lines 3a and 3b, which are all formed on the TFT array substrate, thereby preventing light leakage from a backlight device.

FIG. 2 is a cross sectional view along I-I' of FIG. 1 according to the related art. In FIG. 2, a gate insulating layer 11, upon which the data bus line 3a is formed, is formed on a transparent lower substrate 10a. In order to protect the data bus line 3a, the passivation layer 15 is deposited on the gate insulating layer 11 to cover the data bus line 3a. In addition, an indium tin oxide (ITO) metal is deposited on the passivation layer 15 and etched to form the pixel electrode 9a.

The data bus line 3a and the black matrix 17 overlap the periphery of the pixel electrode 9a and are formed on a transparent upper substrate 10b that faces the lower substrate 10a. The black matrix 17 is provided to intercept light incident from the backlight device except for light incident from the backlight device that passes through a liquid crystal layer (not shown) controlled by the pixel electrode 9a.

However, in the above LCD device, light that passes through the transparent lower substrate at a certain angle is refracted by the gate insulating layer 11 and the passivation layer 15, and then passes through the transparent upper substrate 10b around the black matrix, thereby causing light leakage. For example, when light radiated from the backlight device is transmitted along a direction perpendicular to the transparent lower substrate 10a, light that passes between the data bus lines 3a is intercepted by the black matrix 17. However, any light incident at a certain angle (arrow) is refracted to pass around the black matrix 17. In order to solve this problem, a width of the black matrix 17 may be enlarged to prevent the light leakage. However, if the width of the black matrix 17 is enlarged, the aperture ratio of the pixel electrode 9a is reduced and deteriorates the displayed image quality.

SUMMARY OF THE INVENTION

Accordingly, the present invention is directed to a liquid crystal display device and method of fabricating a liquid crystal display device that substantially obviate one or more problems due to limitations and disadvantages of the related art.

An object of the present invention is to provide a liquid crystal display device, and a method of fabricating a liquid crystal display device that prevents light leakage.

Another object of the present invention is to provide a liquid crystal display device, and a method of fabricating a liquid crystal display device that prevents light leakage and increases aperture ratio.

To achieve these objects and other advantages and in accordance with the purpose of the invention, as embodied and broadly described, a method of fabricating a liquid crystal display device includes forming a gate electrode and a gate bus line on a transparent lower substrate, forming an insulating layer on the gate electrode and gate bus line, forming an active layer on the insulating layer, forming a source electrode, a drain electrode and a data bus line, forming a passivation layer on the transparent lower substrate, forming a refraction layer on the passivation layer, and forming a pixel electrode on a surface of the refraction layer.

In another aspect, a method of fabricating a liquid crystal display device includes forming a gate electrode and a gate bus line on a transparent lower substrate, forming a gate insulating layer on the gate electrode and gate bus line, forming an active layer on the gate insulating layer, forming a source electrode and a drain electrode and a data bus line on the active layer, forming a passivation layer on the transparent lower substrate, forming a metal oxide film on the passivation layer, forming a refraction layer by removing a portion of the metal oxide film, and forming a pixel electrode on the passivation layer and the refraction layer, wherein a peripheral portion of the refraction layer overlaps a peripheral portion of the data bus line.

In another aspect, a liquid crystal display device includes an upper substrate having a black matrix, and a lower substrate having a thin film transistor, a data bus line, a gate bus line, a passivation layer, and a refraction layer formed on the passivation layer, a pixel electrode formed on the refraction layer, wherein a refraction index of the refraction layer is larger than refraction index of the passivation layer.

In another aspect, a thin film transistor array substrate of a liquid crystal display device includes a passivation layer overlying a thin film transistor and a data bus line, and a refraction layer formed on the passivation layer, wherein the refraction layer has a refraction index different a refraction index of the passivation layer.

It is to be understood that both the foregoing general description and the following detailed description of the present invention are exemplary and explanatory and are intended to provide further explanation of the present invention as claimed.

BRIEF DESCRIPTION OF THE DRAWINGS

The accompanying drawings, which are included to provide a further understanding of the present invention and are incorporated in and constitute a part of this application, illustrate embodiments of the present invention and together with the description serve to explain the principle of the present invention. In the drawings.

DETAILED DESCRIPTION OF THE PREFERRED EMBODIMENTS

Reference will now be made in detail to a preferred embodiment of the present invention with reference to the accompanying drawings.

Figure 1:
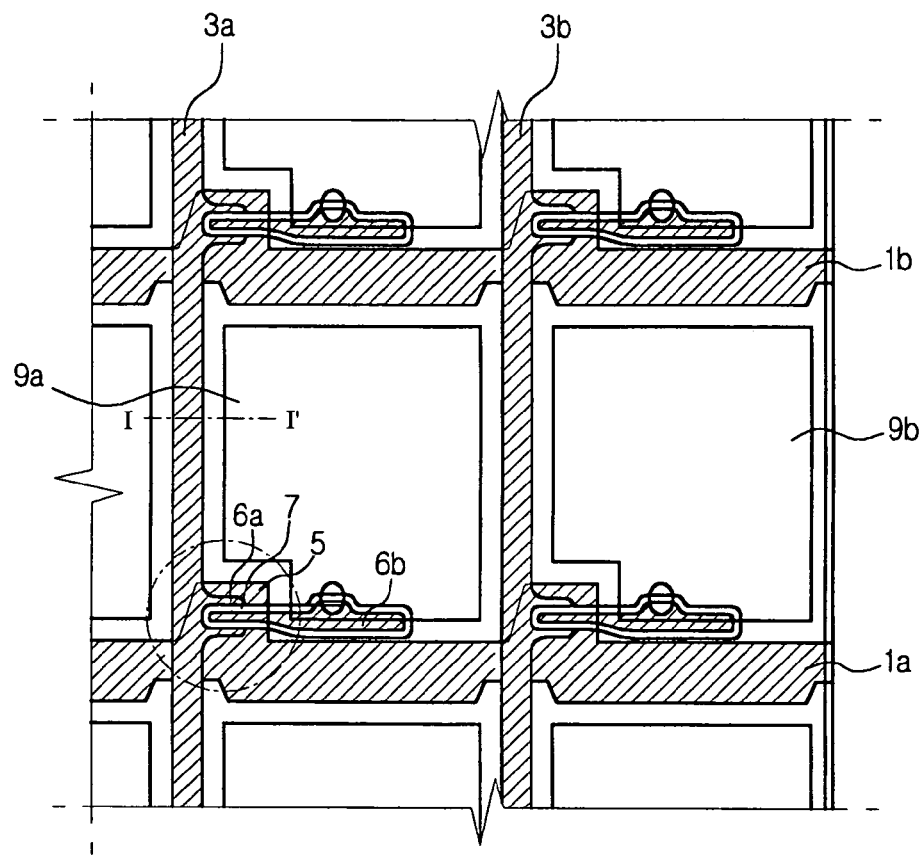
FIG. 1 is a plan view of a liquid crystal display device according to the related art.
Figure 2:
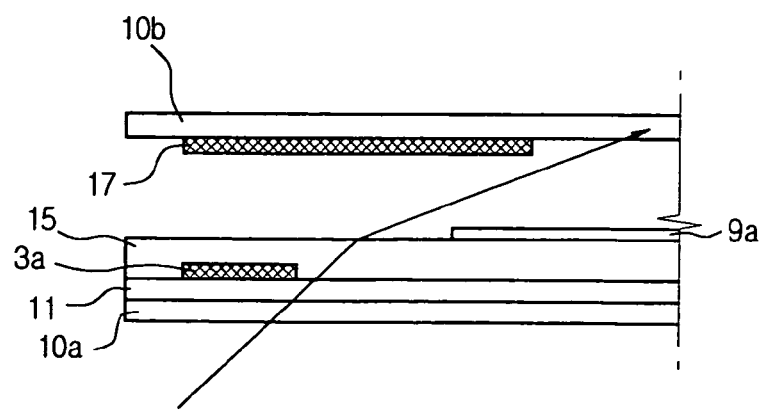
FIG. 2 is a cross sectional view along I-I' of FIG. 1 according to the related art.
Figure 3:
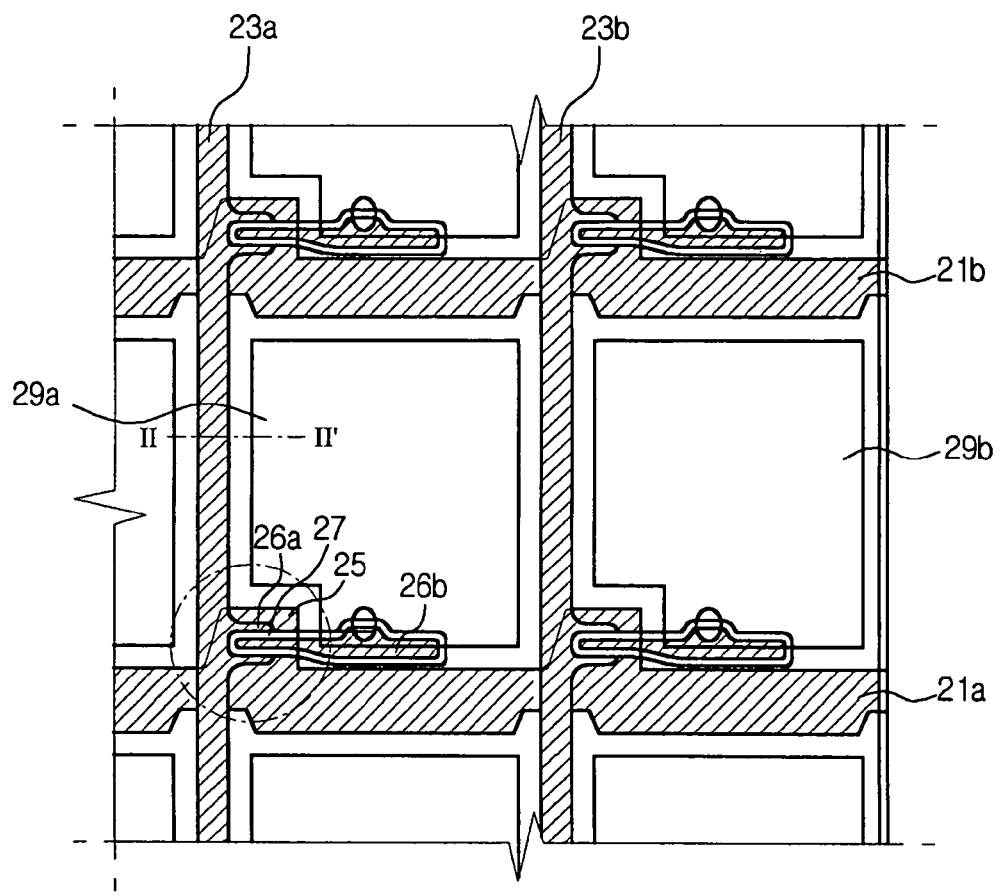
FIG. 3 is a plan view of an exemplary liquid crystal display device according to the present invention.

FIG. 3 is a plan view of an exemplary liquid crystal display device according to the present invention. In FIG. 3, an array substrate of a liquid crystal display device includes unit pixel regions defined by gate bus lines 21a and 21b and data bus lines 23a and 23b on a transparent lower substrate. In addition, thin film transistors (TFTs), which may function as switching elements, may be formed at crossing regions of the gate bus lines 21a and 21b and the data bus lines 23a and 23b. Moreover, pixel electrodes 29a and 29b, which may be formed of indium tin oxide (ITO), may be disposed on the unit pixel regions.

Figure 4:
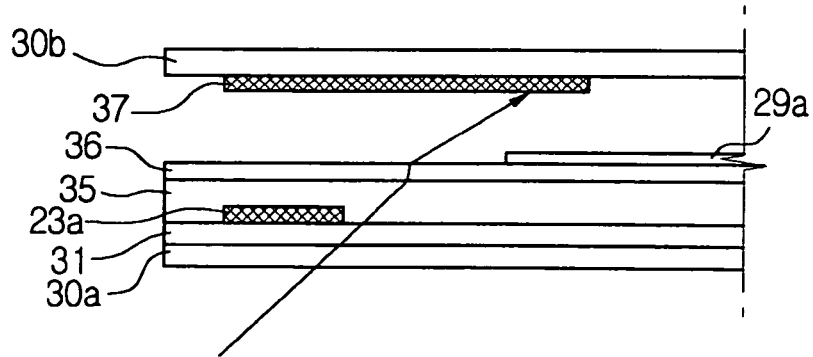
FIG. 4 is a cross sectional view along II-II' of FIG. 3 according to the present invention.

FIG. 4 is a cross sectional view along II-II' of FIG. 3 according to the present invention. In FIG. 4, a black matrix 37 may be formed on an upper substrate 30b (i.e., color filter substrate) to face a lower substrate 30a (i.e., an array substrate) having a TFT that includes, as shown in FIG. 3, a source electrode 26a, a drain electrode 26b, a gate electrode 25, and an active layer 27. The black matrix 37 may be formed on the upper substrate 30b to correspond with the gate bus lines 21a and 21b (in FIG. 3), the TFTs, and the data bus lines 23a and 23b (in FIG. 3) formed on the lower substrate 30a. Accordingly, the black matrix 37 may prevent light leakage that may occur between the gate bus lines 21a and 21b and pixel electrodes 29a and 29b (in FIG. 3) or between the data bus lines 23a and 23b and the pixel electrodes 29a and 29b (in FIG. 3).

Since light radiated from a backlight device undergoes diffraction while being transmitted through the lower substrate 30a and liquid crystal material (not shown) that is provided between the lower and upper substrates 30a and 30b, the light diffracts along corners of the black matrix 37. Therefore, the black matrix 37 may be formed to overlap peripheral portions of the pixel electrodes 29a and 29b (in FIG. 3). However, when the black matrix 37 is enlarged, aperture ratio is reduced. Accordingly, a refraction layer having a high refraction index may be formed between a passivation layer 35 and the pixel electrode 29a. Thus, incident light between the data bus lines 23a and 23b and the pixel electrodes 29a and 29b (in FIG. 3) may be refracted to the black matrix 37, thereby preventing light leakage.

For example, a gate insulting layer 31 may be formed along an entire surface of the lower substrate 30a, and the data bus lines 23a 23b (in FIG. 3) may be formed on the gate insulating layer 31. Next, the passivation layer 35 may be formed on the gate insulating layer 31 to cover the TFTs and the data bus lines 23a. Then, the refraction layer 36 may be deposited on the passivation layer 35. The refraction layer 36 may be formed of a metal oxide that is transparent, such as $TiO_x$ and $SrTi_3$-based materials. The refraction layer 36 may have a refraction index greater than those of the passivation layer 35 and the gate insulating layer 31. Since the passivation layer 35 and the gate insulating layer 31 may be formed of a $SiN_x$-based material having a refraction index of about 2, the refraction layer 36 may have a refraction index greater than 2. In order to prevent excessive refraction of the light, the refraction index of the refraction layer 36 may be less than about 5.

Then, the black matrix 37 may be formed on the upper substrate 30b to correspond to the data bus lines 23a and 23b (in FIG. 3) of the lower substrate 30a. Accordingly, light transmitted through the lower substrate 30a from the backlight device may be incident between the data bus lines 23a and 23b and the pixel electrodes 29a and 29b (in FIG. 3). Thus, the light may pass along a periphery of the black matrix 37 formed on the upper substrate 30b and may be refracted by the refraction layer 36 formed on the passivation layer 35, thereby preventing light leakage.

Refraction of the incident light transmitted between the data bus lines 23a and 23b (in FIG. 3) and the pixel electrodes 29a and 29b (in FIG. 3) follows Snell's law, wherein a ratio "sin θ$_1$/sin θ$_2$" of an outgoing angle θ2 of light to an incoming angle θ1 of light can be represented as "n$_2$/n$_1$", wherein "n$_1$" is a refraction index of a medium of a light incoming region and "n$_2$" is a refraction index of a medium of a light outgoing region. Thus, when the refraction index of the medium of the light incoming region is large, the refraction of the light is reduced at the perpendicular surface of the medium. As a result, the light is refracted toward the black matrix 37, as shown in FIG. 4, wherein the arrow indicates a transmission direction of the light refracted by the refraction layer 36. Moreover, a width of the black matrix 37 may be reduced in response to the refraction index of the refraction layer 36, thereby increasing aperture ratio.

Furthermore, the incident light between the data bus lines 23a and 23b (in FIG. 3) and the pixel electrodes 29a and 29b (in FIG. 3) may be completely intercepted, thereby preventing viewing angle cross talk. In addition, the relationship between the refraction layer 36 and the data bus lines 23a and 23b (in FIG. 3) may be similarly applied to the gate bus lines 21a and 21b (in FIG. 3) to prevent light leakage.

Figure 5:
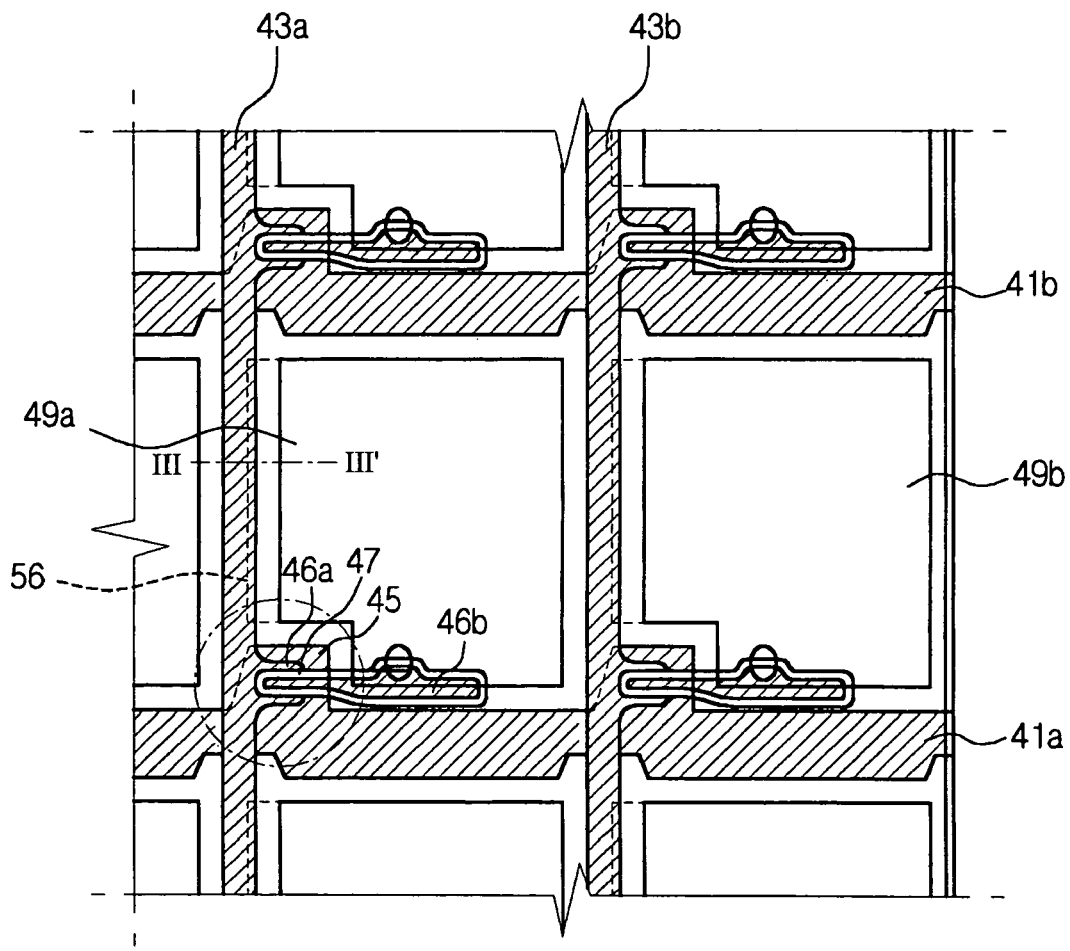
FIG. 5 is a plan view of another exemplary liquid crystal display device according to the present invention.

FIG. 5 is a plan view of another exemplary liquid crystal display device according to the present invention. In FIG. 5, gate bus lines 41a and 41b may be formed on a lower substrate 50a (in FIG. 6) to perpendicularly intersect data bus lines 43a and 43b, thereby defining a plurality of unit pixel regions upon which pixel electrodes 49a and 49b may be formed of indium tin oxide, for example. In addition, the pixel electrodes 49a and 49b may be disposed in parallel with the data bus lines 43a and 43b. A thin film transistor may be disposed adjacent to each of the unit pixel regions and may include a source electrode 46a, a drain electrode 46b, a gate electrode 45, and an active layer 47.

Figure 6:
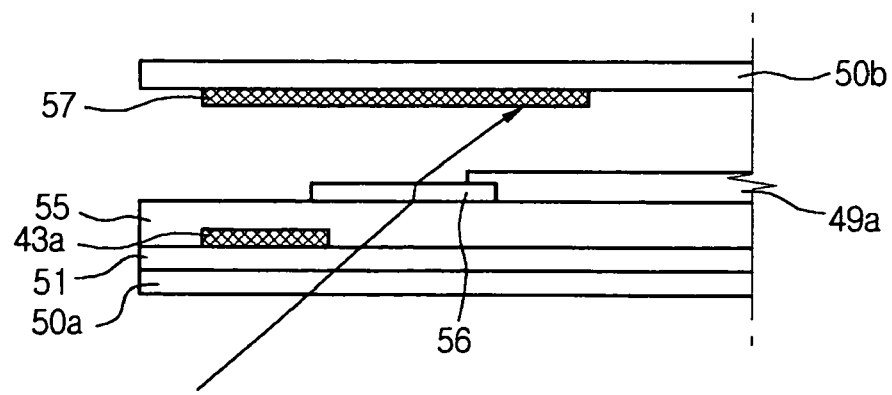
FIG. 6 is a cross sectional view along III-III' of FIG. 5 according to the present invention.

FIG. 6 is a cross sectional view along III-III' of FIG. 5 according to the present invention. In FIG. 6, a black matrix 57 may be formed on an upper substrate 50b that corresponds to the gate bus lines 41a and 41b and the data bus lines 43a and 43b (in FIG. 5), wherein the black matrix 57 may overlap peripheral portions of the pixel electrodes 49a and 49b. In addition, a refraction layer 56 may be formed between the data bus lines 43a and 43b and the pixel electrodes 49a and 49b (in FIG. 5) on a passivation layer 55. Both peripheral portions of the refraction layer 56 may overlap portions of the data bus lines 43a and 43b and portions of the pixel electrodes 49a and 49b (in FIG. 5). The refraction layer 56 may be formed of a metal oxide, such as TiO$_x$ and SrTi$_3$-based materials, having a refraction index greater than about 2. Accordingly, the refraction layer 56 may not be deposited along an entire surface of a passivation layer 55, but may be provided within light leakage portions of the passivation layer 55 between the data bus lines 43a and 43b and the pixel electrodes 49a and 49b (in FIG. 5).

In FIG. 6, a gate insulating layer 51 may be deposited onto the lower substrate 50a, and the data bus line 43a and the source electrode 46a and the drain electrode 46b may be formed on the gate insulating layer 51. Next, the passivation layer 55 may be deposited onto the lower substrate 50a to protect the TFTs and the data bus lines 43a and 43b. Then, a material for forming the refraction layer 56 may be formed on portions of the passivation layer 55. The material, such as TiO$_x$, SrTi$_3$-based materials, for forming the refraction layer 56 may include a transparent metal oxide film having a refraction index of more than about 2.

For example, the refraction layer 56 may be formed by depositing the transparent metal oxide film along an entire surface of the passivation layer 55, and then portions of transparent metal oxide film may be removed using a photoresist and a diffraction exposure using a half-tone pattern. In addition, developing and etching processes may be performed during the diffraction exposure such that portions of the passivation layer 55 and the refraction layer 56 may be removed. In other words, by using the half-tone pattern, a single process step may be performed such that the passivation and refraction layers 55 and 56 may be formed along an entire surface of the lower substrate 50a, and only specific portions of the passivation and refraction layers 55 and 56 may be removed. Moreover, during the process using the half-tone pattern, contact holes may be formed to exposed gate and data pads (not shown), and the TFTs and the data lines may be protected by the passivation layer 55.

Accordingly, the refraction layer 56 may be formed between the data bus lines 43a and 43b and the pixel electrodes 49a and 49b (in FIG. 5) without having to use an additional mask process for forming the refraction layer 56.

It will be apparent to those skilled in the art that various modifications and variations can be made in liquid crystal display device and method of fabricating a liquid crystal display device of the present invention without departing from the spirit or scope of the invention. Thus, it is intended that the present invention covers the modifications and variations of this invention provided they come within the scope of the appended claims and their equivalents.

What is claimed is:

1. A method of fabricating a liquid crystal display device, comprising the steps of:
    forming a gate electrode and a gate bus line on a transparent lower substrate;
    forming an insulating layer on the gate electrode and gate bus line;
    forming an active layer on the insulating layer;
    forming a source electrode, a drain electrode and a data bus line;
    forming a passivation layer on the transparent lower substrate;
    forming a refraction layer on the passivation layer; and
    forming a pixel electrode on a surface of the refraction layer;
    wherein the refraction layer is formed between one of the data and gate bus lines and the pixel electrode, and both peripheral portions of the refraction layer overlap a portion of one of the data and gate bus lines and a portion of the pixel electrode; and
    wherein the refraction layer refracts and transmits substantially all of the light incident in a direction from the lower substrate towards an upper substrate so that light incident between one of the data and gate bus lines and the pixel electrode is blocked by a black matrix formed to overlap a peripheral portion of the pixel electrode and to correspond to the gate line and the data line.

2. The method according to claim 1, wherein the refraction layer includes at least one of a TiO$_x$-based metal oxide ad a SrTi$_3$-based metal oxide.

3. The method according to claim 1, wherein the refraction layer has a first refraction index, the passivation layer has a second refraction index, and the insulating layer has a third refraction index, wherein the first refraction index is larger than the second and third refraction indexes.

4. The method according to claim 1, wherein the refraction layer has a refraction index within a range of about 2-5.

5. A method of fabricating a liquid crystal display device, comprising the steps of:
   forming a gate electrode and a gate bus line on a transparent lower substrate;
   forming a gate insulating layer on the gate electrode and gate bus line;
   forming an active layer on the insulating layer;
   forming a source electrode, a drain electrode and a data bus line on the active layer;
   forming a passivation layer on the transparent lower substrate;
   forming a metal oxide film on the passivation layer;
   forming a refraction layer by removing a portion of the metal oxide film; and
   forming a pixel electrode on the passivation layer and the refraction layer, wherein the refraction layer is formed between one of the data and gate bus lines and the pixel electrode, and both peripheral portions of the refraction layer overlap a portion of one of the data and gate bus lines and a portion of the pixel electrode;
   wherein the refraction layer refracts and transmits substantially all of the light incident in a direction from the lower substrate towards an upper substrate so that light incident between one of the data and gate bus lines and the pixel electrode is blocked by a black matrix formed to overlap a peripheral portion of the pixel electrode and to correspond to the gate line and the data line.

6. The method according to claim 5, wherein the metal oxide film includes at least one of a $TiO_x$-based metal oxide ad a $SrTi_3$-based metal oxide.

7. The method according to claim 5, wherein a peripheral portion of the pixel electrode overlaps the refraction layer.

8. The method according to claim 7, wherein a region where peripheral portion of the pixel electrode overlaps the refraction layer corresponds to a black matrix formed on a transparent upper substrate.

9. The method according to claim 5, wherein the refraction layer has a refraction index that is larger than refraction indexes of the passivation layer and the insulating layer.

10. The method according to claim 5, wherein the metal oxide film has a refraction index within a range of about 2-5.

11. The method according to claim 5, wherein the step of forming a refraction layer includes etching the metal oxide film using a half-tone pattern.

12. The method according to claim 5, wherein the step of forming a refraction layer includes forming a plurality of contact holes to exposed portions of gate and data pads.

13. A liquid crystal display device, comprising:
   an upper substrate having a black matrix; and
   a lower substrate having a thin film transistor, a data bus line, a gate bus line, a passivation layer, and a refraction layer formed on the passivation layer;
   a pixel electrode formed on the refraction layer;
   wherein a refraction index of the refraction layer is larger than refraction index of the passivation layer; and
   wherein the refraction layer is formed between one of the data and gate bus lines and the pixel electrode, and both peripheral portions of the refraction layer overlap a portion of one of the data and gate bus lines and a portion of the pixel electrode;
   wherein the refraction layer refracts and transmits substantially all of the light incident in a direction from the lower substrate towards an upper substrate so that light incident between one of the data and gate bus lines and the pixel electrode is blocked by a black matrix formed to overlap a peripheral portion of the pixel electrode and to correspond to the gate line and the data line.

14. The device according to claim 13, wherein the refraction layer is formed between a central portion of the black matrix and a peripheral portion of the data bus line.

15. The device according to claim 13, wherein the refraction layer has a refraction index within a rage of about 2-5.

16. The device according to claim 13, wherein a peripheral portion of the refraction layer contacts a lower peripheral portion of the pixel electrode.

17. The device according to claim 13, wherein the refraction layer includes at least one of a $TiO_x$-based metal oxide ad a $SrTi_3$-based metal oxide.

18. The device according to claim 13, wherein the refraction layer refracts light incident between the data bus line and the pixel electrode.

19. The device according to claim 13, wherein the thin film transistor includes a gate insulating film, wherein the refraction index of the refraction layer is larger than a refraction index of the gate insulating layer.

20. A thin film transistor array substrate of a liquid crystal display device, comprising:
   a passivation layer overlying a thin film transistor and a data bus line; and
   a refraction layer formed on the passivation layer,
   wherein a refraction index of the refraction layer is larger than refraction index of the passivation layer; and
   wherein the refraction layer is formed between one of the data bus line and a gate bus line and a pixel electrode, and both peripheral portions of the refraction layer overlap a portion of one of the data and gate bus lines and a portion of the pixel electrode;
   wherein the refraction layer refracts and transmits substantially all of the light incident in a direction from the lower substrate towards an upper substrate so that light incident between one of the data and gate bus lines and the pixel electrode is blocked by a black matrix formed to overlap a peripheral portion of the pixel electrode and to correspond to the gate line and the data line.

* * * * *